United States Patent
Inaba et al.

(10) Patent No.: US 11,612,144 B2
(45) Date of Patent: Mar. 28, 2023

(54) ANIMAL INDIVIDUAL IDENTIFICATION MEMBER AND ANIMAL DATA MANAGEMENT SYSTEM

(71) Applicant: Panasonic Intellectual Property Management Co., Ltd., Osaka (JP)

(72) Inventors: Yuichi Inaba, Osaka (JP); Hiromitsu Fujiyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 189 days.

(21) Appl. No.: 17/267,913

(22) PCT Filed: Jul. 23, 2019

(86) PCT No.: PCT/JP2019/028754
§ 371 (c)(1),
(2) Date: Feb. 11, 2021

(87) PCT Pub. No.: WO2020/044867
PCT Pub. Date: Mar. 5, 2020

(65) Prior Publication Data
US 2021/0161106 A1    Jun. 3, 2021

(30) Foreign Application Priority Data
Aug. 28, 2018  (JP) .............................. JP2018-159506

(51) Int. Cl.
*A01K 29/00* (2006.01)
*A01K 11/00* (2006.01)

(52) U.S. Cl.
CPC .......... *A01K 29/005* (2013.01); *A01K 11/004* (2013.01)

(58) Field of Classification Search
CPC ................ A01K 29/005; A01K 11/004; A01K 11/001; A01K 11/006; A01K 29/00;
(Continued)

(56) References Cited

U.S. PATENT DOCUMENTS

| | | | | |
|---|---|---|---|---|
| 4,718,374 A | * | 1/1988 | Hayes ................ | A01K 11/004 119/655 |
| 4,741,117 A | * | 5/1988 | Fearing ............... | A01K 11/001 40/301 |
| 5,189,986 A | * | 3/1993 | Burkoth ................. | A61D 7/00 604/304 |

(Continued)

FOREIGN PATENT DOCUMENTS

| CN | 1572138 A | 2/2005 |
|---|---|---|
| CN | 102369886 A | 3/2012 |

(Continued)

OTHER PUBLICATIONS

International Search Report (ISR) dated Oct. 15, 2019 in International (PCT) Application No. PCT/JP2019/028754.

(Continued)

*Primary Examiner* — Omar Casillashernandez
(74) *Attorney, Agent, or Firm* — Renner, Otto, Boisselle & Sklar, LLP

(57) ABSTRACT

An animal individual identification member includes a first base brought into contact with a body of an animal, a second base including an identification portion indicating identification information of the animal by a sequence of mutually different adjacent colors, and an adhesive layer which is located between the first base and the second base and bonds the first base and the second base. The first base, the second base, and the adhesive layer have identical resin skeletons.

13 Claims, 3 Drawing Sheets

(58) Field of Classification Search
CPC ............... B32B 3/08; B32B 5/022; B32B 2262/0292; B32B 2307/402; B32B 2519/00; B32B 7/12; B32B 27/08; B32B 27/12; B32B 27/40; B42D 25/36; B42D 25/47; G06K 19/06018; G06K 2019/06225; G06K 19/0614
USPC ................................................. 340/573.1
See application file for complete search history.

(56) References Cited

U.S. PATENT DOCUMENTS

| | | | | |
|---|---|---|---|---|
| 6,113,539 | A * | 9/2000 | Ridenour | A61B 5/68 128/903 |
| 2004/0144004 | A1* | 7/2004 | Constatini | A01K 11/001 40/301 |
| 2005/0051109 | A1* | 3/2005 | Fantin | A01K 11/004 119/721 |
| 2007/0006494 | A1* | 1/2007 | Hayes | A01K 11/001 40/301 |
| 2011/0248830 | A1* | 10/2011 | Jeppesen | A01K 11/004 340/10.1 |
| 2012/0285056 | A1* | 11/2012 | Corrales, Jr. | A01K 11/002 40/301 |
| 2017/0280688 | A1* | 10/2017 | Deliou | H01Q 1/2225 |
| 2017/0318781 | A1* | 11/2017 | Rollins | G06K 7/0008 |
| 2018/0197063 | A1* | 7/2018 | Kapoor | G06K 19/077 |
| 2019/0385037 | A1* | 12/2019 | Robadey | H04B 5/0075 |
| 2020/0029534 | A1* | 1/2020 | Austin | A61D 17/002 |

FOREIGN PATENT DOCUMENTS

| | | | |
|---|---|---|---|
| EP | 3430897 | * | 9/2017 |
| EP | 3430897 | A1 | 1/2019 |
| JP | 2004-357660 | A | 12/2004 |
| JP | 2006-304768 | * | 11/2006 |
| JP | 2006-304768 | A | 11/2006 |
| JP | 2007-252356 | A | 10/2007 |
| JP | 2007252356 | * | 10/2007 |
| JP | 2010-193893 | A | 9/2010 |
| JP | 2010193893 | * | 9/2010 |
| JP | 2016-47638 | A | 4/2016 |
| JP | 2016047638 | * | 4/2016 |
| JP | 2016-176796 | A | 10/2016 |
| JP | 2016176796 | * | 10/2016 |
| WO | 2017/158698 | A1 | 9/2017 |

OTHER PUBLICATIONS

Written Opinion dated Oct. 15, 2019 in International (PCT) Application No. PCT/JP2019/028754.
Chinese Office Action for corresponding Chinese Patent Application No. 201980056275.8 dated Apr. 25, 2022.
Chinese Search Report for corresponding Chinese Patent Application No. 201980056275.8 dated Jul. 23, 2019 with English translation.
Extended European Search Report dated Oct. 27, 2021 in connection with European Patent Application 19854424.9.

* cited by examiner

ANIMAL INDIVIDUAL IDENTIFICATION MEMBER AND ANIMAL DATA MANAGEMENT SYSTEM

TECHNICAL FIELD

The present disclosure relates to an animal individual identification member and an animal data management system including the same.

BACKGROUND ART

Techniques for identifying individuals of animals are known in the related art. PTL 1 discloses a marker for individual identification used in farm animals, animals, and plants.

CITATION LIST

Patent Literature

PTL 1: Japanese Unexamined Patent Application Publication No. 2004-357660

SUMMARY OF THE INVENTION

Technical Problem

The present disclosure provides an animal individual identification member having improved durability and an animal data management system including the same.

Solutions to Problem

The animal individual identification member according to one aspect of the present disclosure includes a first base that is brought into contact with a body of an animal; a second base including an identification portion indicating identification information of the animal by a sequence of mutually different adjacent colors; and an adhesive layer which is located between the first base and the second base and bonds the first base and the second base. The first base, the second base, and the adhesive layer have identical resin skeletons.

The animal data management system according to one aspect of the present disclosure includes an image capturing unit configured to obtain image data of an image including the animal individual identification member; an identification information obtaining unit configured to obtain the identification information based on the image data; a position information obtaining unit configured to obtain position information of the animal based on the image data; and an information storage configured to store the identification information and the position information in association with each other.

Advantageous Effect of Invention

The present disclosure provides an animal individual identification member having improved durability and an animal data management system including the same.

DESCRIPTION OF EXEMPLARY EMBODIMENTS

Figure 1:
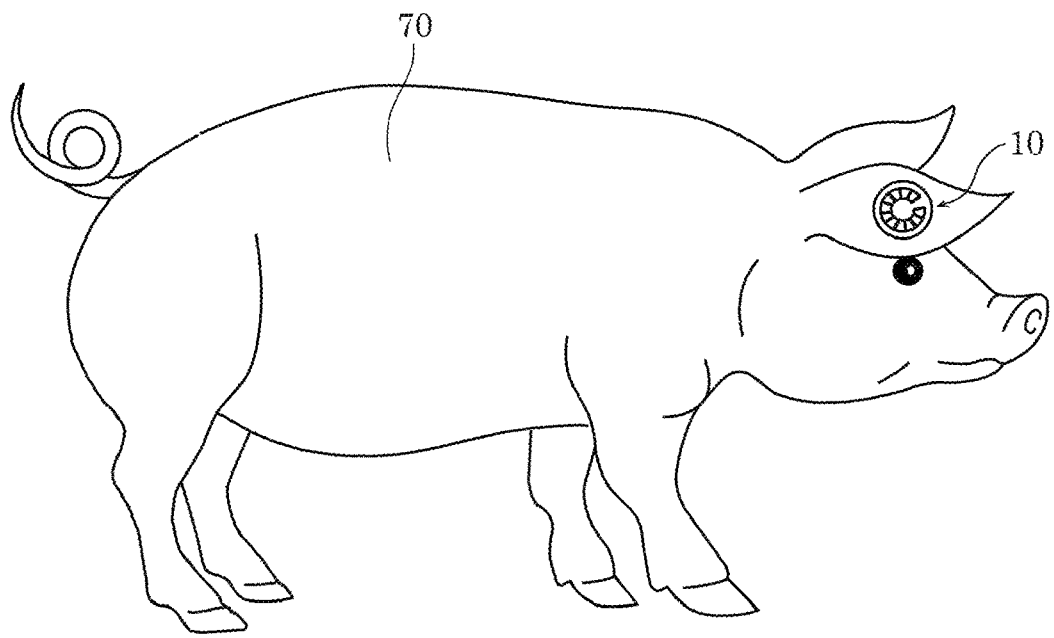
FIG. 1 is a diagram illustrating a usage example of the animal individual identification member according to Embodiment 1.

Embodiments will now be described with reference to the drawings. The embodiments described below all illustrate comprehensive or specific examples. Numeric values, shapes, materials, components, arrangements and positions of components, and connections forms thereof shown in the embodiments below are illustrative, and should not be construed as limitations to the present disclosure. Moreover, among the components of the embodiments below, the components not described in an independent claim will be described as arbitrary components.

The drawings are schematic views, and are not always strictly drawn. In the drawings, identical referential numerals are given to substantially identical configurations, and the duplication of description will be omitted or simplified in some cases.

Embodiment 1

[Configuration]

The animal individual identification member according to Embodiment 1 will now be described. FIG. 1 is a diagram illustrating a usage example of the animal individual identification member according to Embodiment 1.

Figure 2:
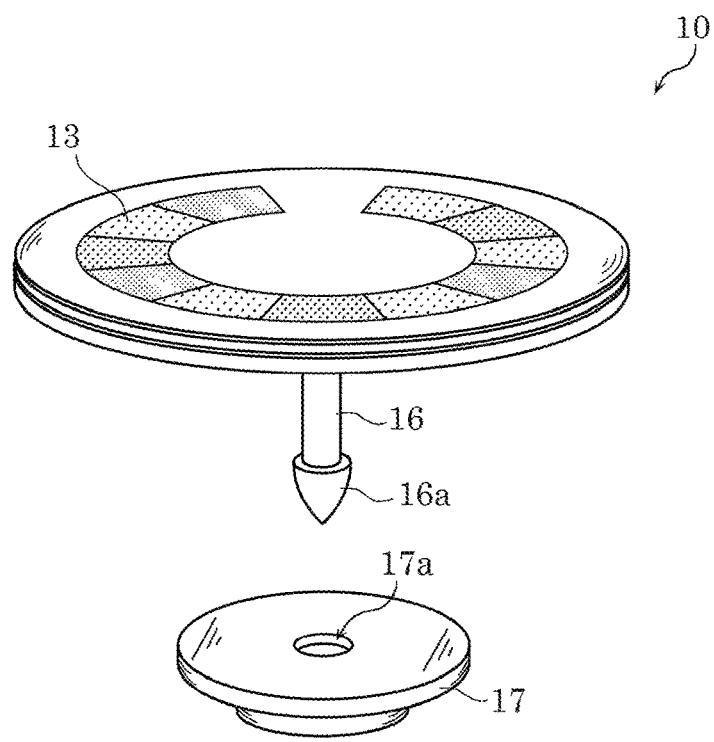
FIG. 2 is a perspective view illustrating an appearance of the animal individual identification member according to Embodiment 1.
Figure 3:
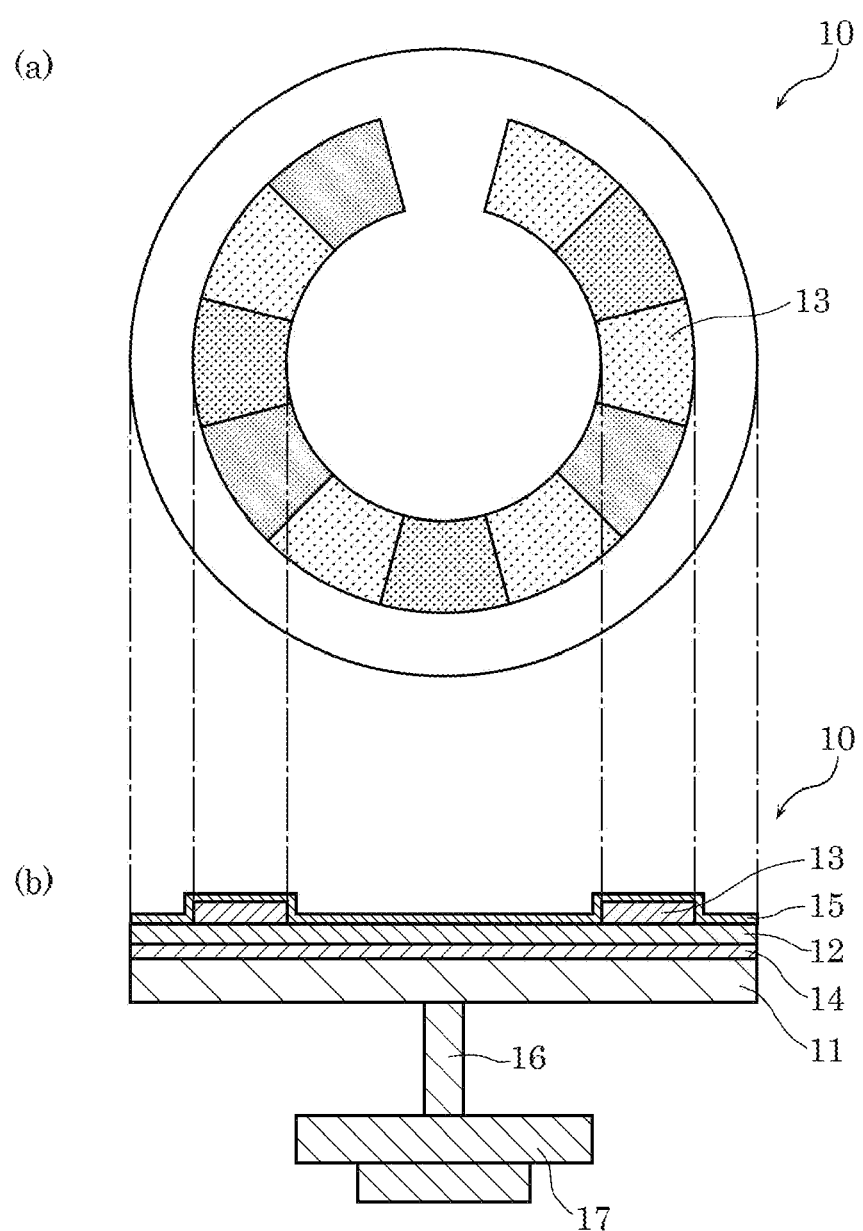
FIG. 3 is a plan view and a cross-sectional view illustrating the animal individual identification member according to Embodiment 1.

Animal individual identification member 10 is a disk-shaped identification tag used to identify individuals of pigs 70 raised in a pig pen, for example. As illustrated in FIG. 1, animal individual identification member 10 is attached to an ear of pig 70. FIG. 2 is a perspective view illustrating animal individual identification member 10, where (a) of FIG. 3 is a plan view of animal individual identification member 10 and (b) of FIG. 3 is a cross-sectional view of animal individual identification member 10.

Animal individual identification member 10 specifically includes first base 11, second base 12, identification portion 13, adhesive layer 14, protective layer 15, post 16, and stopper 17.

First base 11 has a disk shape. First base 11 is mainly made of a polyurethane resin. In other words, first base 11 has a urethane skeleton (in other words, a polyurethane skeleton). First base 11 has flexibility and can be bent by hands to some extent. First base 11 has a color of white, for example. Second base 12 is bonded to the top surface of first base 11 with adhesive layer 14. Post 16 is erected from the bottom surface of first base 11.

Second base 12 has a shape of a circular sheet, and serves as an underlying layer for identification portion 13. Second base 12 is mainly made of a polyurethane non-woven fabric. In other words, second base 12 has the urethane skeleton. Second base 12 has a color of white, for example. Identification portion 13 is disposed on the top surface of second base 12. First base 11 is bonded to the bottom surface of second base 12 with adhesive layer 14.

Identification portion 13 constitutes a so-called color code. In other words, identification portion 13 indicates the identification information of pig 70 by a sequence of mutually different adjacent colors. When identification portion 13 is captured with a camera (image capturing unit), the identification information of pig 70 can be specified by image processing of the captured image. Identification portion 13 is located between the top surface of second base 12 and protective layer 15. Identification portion 13 is formed on the top surface of second base 12 by printing.

Identification portion 13 in animal individual identification member 10 indicates the identification information (i.e., ID) of pig 70 by a sequence of mutually different adjacent colors excluding colors of white and black (e.g., three colors of red (R), green (G), and blue (B)). In the color code, the bit value is determined according to the adjacent colors. For example, when the adjacent colors in the color code change from red to blue, from blue to green, and from green to red, the bit value is "1". When the adjacent colors change from red to green, from green to blue, and from blue to red, the bit value is "0". Thus, the rule for identifying the color code as digital data is preliminarily specified.

Any color can be used in identification portion 13. At least one of white or black may be used in identification portion 13. Alternatively, identification portion 13 may indicate the identification information of pig 70 by a sequence of mutually different adjacent colors which are fluorescent colors. This can enhance the visibility of identification portion 13.

Although the mutually different adjacent colors are aligned in the form of a character C (or a Landolt ring) in identification portion 13, the mutually different adjacent colors may be linearly aligned, or may be aligned in a matrix.

Adhesive layer 14 is located between first base 11 and second base 12 and bonds first base 11 and second base 12. Adhesive layer 14 is mainly made of a polyurethane resin. In other words, adhesive layer 14 has a urethane skeleton. Adhesive layer 14 may be formed by applying a liquid adhesive, or may be formed as a sheet member.

Protective layer 15 has a shape of a circular sheet and covers identification portion 13. Protective layer 15 is transparent or translucent. Thus, the visibility of identification portion 13 is not significantly affected by protective layer 15. Protective layer 15 is mainly made of a polyurethane resin. In other words, protective layer 15 has the urethane skeleton. Although the details are not illustrated, protective layer 15 includes an adhesive layer which bonds protective layer 15 to the top surfaces of second base 12 and identification portion 13.

Post 16 is a cylindrical member erected from the bottom surface of first base 11 to connect first base 11 and stopper 17. Post 16 is mainly made of a polyurethane resin. In other words, post 16 has the urethane skeleton. Post 16 has a color of white, for example. Post 16 is integrally formed with first base 11, for example. Port 16 may be formed separately from first base 11.

Conical portion 16a made of a metal is attached to the distal end of post 16. When animal individual identification member 10 is attached to the ear of pig 70, conical portion 16a is pressed against the ear of pig 70 with the dedicated jig to penetrate through the ear and be forced into hole 17a of stopper 17. As a result, conical portion 16a is caught by the surrounding portion of hole 17a, and stopper 17 functions as a structure for preventing fall-off of animal individual identification member 10 (or an anti-falling structure).

Stopper 17 is a flat cylindrical member which functions as a structure for preventing fall-off of animal individual identification member 10. Stopper 17 is made of the same material as that for first base 11. In other words, stopper 17 is mainly made of a polyurethane resin, and has the urethane skeleton. Stopper 17 has a color of white, for example.

[Effects]

In general, it takes 3 to 6 months to raise pigs 70 in a pig pen until they are available for shipment. Accordingly, animal individual identification member 10 used in pigs 70 requires durability. Moreover, animal individual identification member 10 may be bitten or licked by pigs 70. Thus, it is significantly required that animal individual identification member 10 should have enhanced durability.

To satisfy this requirement, animal individual identification member 10 for pig 70 or the like includes first base 11 that is brought into contact with the body of the animal, second base 12 including identification portion 13 indicating the identification information of the animal by a sequence of mutually different adjacent colors, and adhesive layer 14 which is located between first base 11 and second base 12 and bonds first base 11 and second base 12. First base 11, second base 12, and adhesive layer 14 have identical resin skeletons. For example, first base 11, second base 12, and adhesive layer 14 have urethane skeletons.

Such a configuration enhances bonding properties of first base 11, second base 12, and adhesive layer 14. Moreover, first base 11, second base 12, and adhesive layer 14 have similar stretching properties, which reduce breakage of animal individual identification member 10 caused by an external force such as bending. Accordingly, animal individual identification member 10 can have enhanced durability.

Moreover, second base 12 is a non-woven fabric, for example.

In such a configuration, identification portion 13 is readily disposed on second base 12.

Moreover, identification portion 13 indicates the identification information by the sequence of mutually different adjacent colors aligned in a C shape, for example.

Such a configuration can reduce the size of animal individual identification member 10 compared to the case where identification portion 13 indicates the identification information by a sequence of mutually different adjacent colors linearly aligned.

Moreover, the mutually different adjacent colors are fluorescent colors, for example.

Such a configuration can highlight identification portion 13. For example, the visibility of identification portion 13 in dark places can be enhanced.

Moreover, animal individual identification member 10 further includes protective layer 15 which covers identification portion 13, for example.

Such a configuration reduces the breakage of identification portion 13.

Moreover, first base 11, second base 12, adhesive layer 14, and protective layer 15 have identical resin skeletons, for example.

Such a configuration enhances the bonding properties of first base 11, second base 12, adhesive layer 14, and protective layer 15. Moreover, first base 11, second base 12, adhesive layer 14, and protective layer 15 have similar stretching properties, which reduce the breakage of animal individual identification member 10 caused by an external force such as bending. Accordingly, animal individual identification member 10 can have enhanced durability.

[Modifications]

As described above, animal individual identification member 10 may be bitten or licked by pig 70. For this reason, first base 11 may contain an animal-repellent material. The animal-repellent material is a hot pepper component (more specifically, capsaicin), for example, and is mixed with the resin material when first base 11 is formed. The animal-repellent material may be any other material than the hot pepper component. The animal-repellent material may be a material which stimulates the animal when eaten by the animal, or may be a material which stimulates the animal by its odor.

Thus, the animal-repellent material contained in first base 11 reduces the possibility that the animal bites or licks animal individual identification member 10. Accordingly, such a material enhances the durability of animal individual identification member 10.

Embodiment 2

[Configuration]

Figure 4:
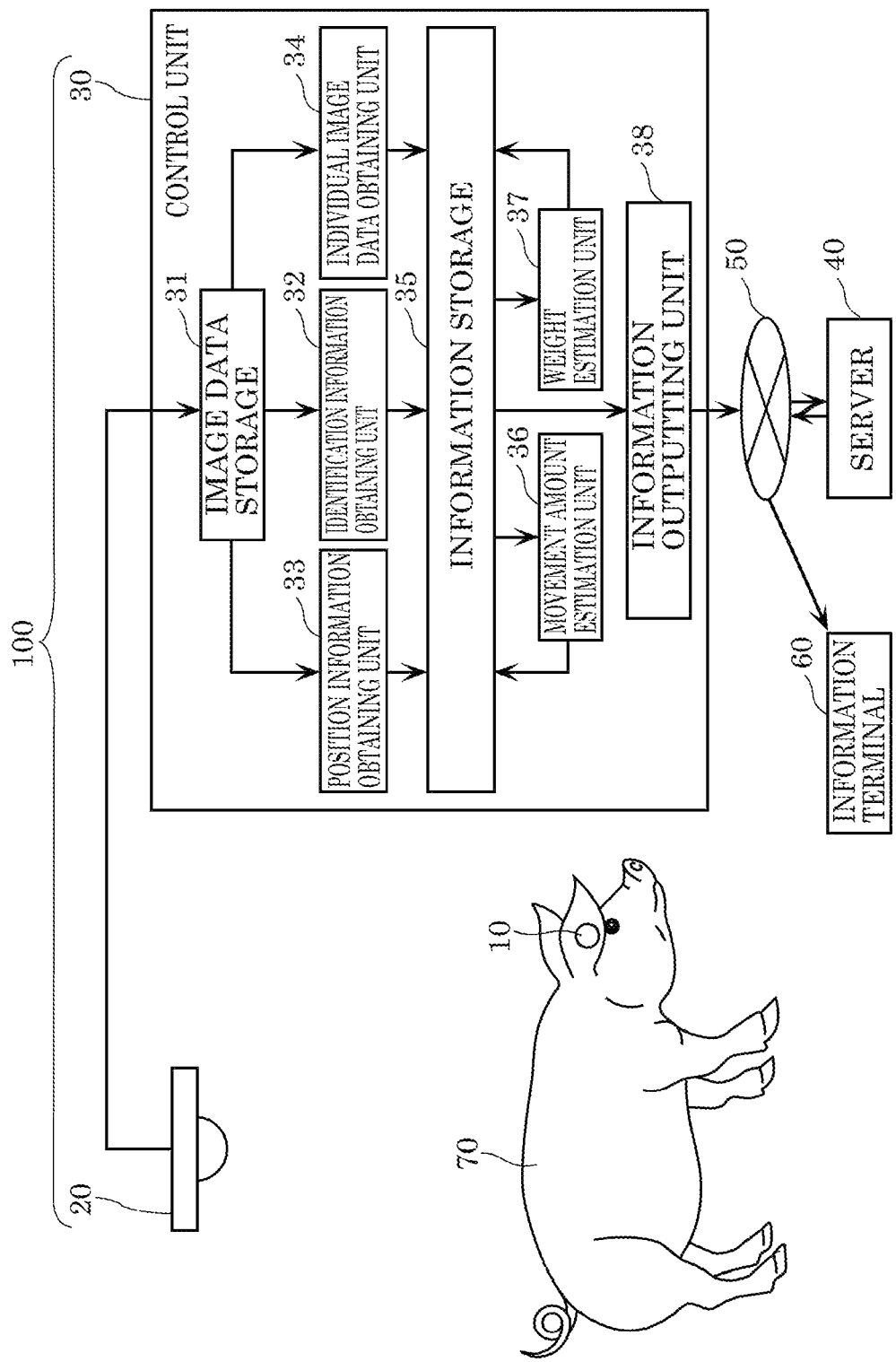
FIG. 4 is a block diagram illustrating the functional configuration of the animal data management system according to Embodiment 2.

In Embodiment 2, an animal data management system including animal individual identification member 10 will be described. FIG. 4 is a block diagram illustrating a functional configuration of the animal data management system according to Embodiment 2. Although the information processing for managing the information on one pig 70 will be described in Embodiment 2 below, actually, the same information processing is performed to manage the information of a plurality of pigs 70 in the pig pen.

Animal information management system 100 is a system which a raiser of pig 70 uses to know the raising states of pigs 70. As illustrated in FIG. 4, animal data management system 100 includes image capturing unit 20 and control unit 30. To be noted, image capturing unit 20 and control unit 30 may be implemented as a single device.

Image capturing unit 20 is installed on a ceiling of the pig pen or the like, and captures an image inside the pig pen to obtain the image data thereof. Image capturing unit 20 is a camera implemented as a CMOS image sensor, for example.

Control unit 30 is a computer which performs information processing using the image data output from image capturing unit 20. More specifically, control unit 30 is implemented by a processor and a memory which stores programs executed by the processor to implement the information processing. Control unit 30 includes image data storage 31, identification information obtaining unit 32, position information obtaining unit 33, individual image data obtaining unit 34, information storage 35, movement amount estimation unit 36, weight estimation unit 37, and information outputting unit 38.

Image data storage 31 temporarily stores the image data obtained by image capturing unit 20. Image data storage 31 stores the image data obtained by image capturing unit 20 until it receives a signal to instruct deletion of the image data based on the operation by a user. However, image data storage 31 may automatically delete the stored image data at stages where the stored image data is no longer needed. This can reduce the memory volume in image data storage 31.

Identification information obtaining unit 32 obtains the identification information of pig 70 based on the image data. Identification information obtaining unit 32 reads the identification information by image recognition processing from a portion of the image data corresponding to identification portion 13 of animal individual identification member 10.

Position information obtaining unit 33 obtains the position information of pig 70 based on the image data. Specifically, position information obtaining unit 33 determines the position of pig 70 based on the position of pig 70 on the image data of the pig pen, pig 70 being identified by the read identification information.

Individual image data obtaining unit 34 obtains the individual image data of pig 70 based on the image data. In other words, individual image data obtaining unit 34 cuts off the individual image data of pig 70 from the image data of the whole pig pen. Individual image data obtaining unit 34 generates the image data of the projection geometry of pig 70 from the individual image data.

The image data of the projection geometry enables identification of the contour of pig 70. Information storage 35 stores the identification information, the position information, and the individual image data (specifically, the image data of the projection geometry) of pig 70 in association with one another.

Information storage 35 stores the identification information and position information of pig 70 as time-series data. The time-series data refers to a series of values having time information (time stamp). In other words, information storage 35 stores the identification information and position information of pig 70 in association with the information of the date and time when the identification information and the position information are obtained.

Movement amount estimation unit 36 estimates the amount of movement of pig 70 for a predetermined period, such as one day, based on the time-series data of the position information stored in information storage 35. The amount of movement is the total length of straight lines obtained by sequentially connecting the positions of pig 70 with the straight lines according to the time series. The estimated amount of movement is stored in information storage 35.

Weight estimation unit 37 estimates the weight of pig 70 based on the individual image data of pig 70 (such as the projection geometry data) stored in information storage 35. The estimated weight is stored in information storage 35.

Information outputting unit 38 is a communication circuit (communication module) for transmitting the information stored in information storage 35 to server 40 or information terminal 60 of the raiser via a wide area communication network such as the Internet. The communication performed by information outputting unit 38 may be wired communication, or may be wireless communication. Information outputting unit 38 may perform communication according to any communication standards. Specifically, information terminal 60 is a portable information terminal such as a smartphone or a tablet terminal, or a stationary information terminal such as a personal computer. When the variety of pieces of information described above are transmitted to information terminal 60, the raiser can know the raising states of pigs 70. The variety of pieces of information may be distributed to information terminal 60 by server 40.

[Effects]

As described above, animal data management system 100 includes image capturing unit 20 which obtains image data of an image including animal individual identification member 10, identification information obtaining unit 32 which obtains identification information based on the image data, position information obtaining unit 33 which obtains the position information of pig 70 based on the image data, and information storage 35 which stores the identification information and the position information in association with each other.

Such animal data management system 100 can manage the information of the animal based on the image data.

Other Embodiments

Although Embodiments 1 and 2 have been described above, these embodiments should not be construed as limitations to the present disclosure.

For example, although the animal individual identification member is attached to pigs in Embodiments 1 and 2, the animal individual identification member may be attached to any animal other than pigs. The animal individual identification member may be attached to farm animals other than pigs, such as cows.

Similarly, although the animal data management system manages the information of the pigs inside the pig pen, the animal data management system may manage the information of farm animals other than pigs, such as cows. The animal data management system may also be used in applications other than livestock raising, and may be used in zoos, for example.

In Embodiment 1, the animal individual identification member is brought into direct contact with the skin of the animal. For this reason, a highly biocompatible material without exerting any hazardous action to the body tissues such as the skin is suitable for the animal individual identification member. For this reason, the first base, the second base, the adhesive layer, and the protective layer may have identical resin skeletons other than the urethane skeleton. Examples of the resin skeletons in this case include poly(vinyl chloride), silicone, polyethylene, and poly(methyl methacrylate) skeletons.

Although the main materials which form the layers included in the laminate structure of the animal individual identification member are exemplified in Embodiment 1, the layers included in the laminate structure of the animal individual identification member may contain other materials in the range enabling implementation of the same function as that of the laminate structure according to the embodiment above.

In Embodiment 2, the processing executed by a specific processor may be executed by another processor. Moreover, the order of several processings may be changed, or several processings may be executed in parallel.

In Embodiment 2, the components may be implemented by executing software programs suitable for the components. The components may be implemented by a program executing unit such as a CPU or a processor, which reads out and executes the software programs stored in a recording medium such as a hard disk or a semiconductor memory.

The components may be implemented by hardware. For example, the component such as a control unit may be a circuit (or an integrated circuit). These circuits may constitute a single circuit as a whole, or may be separate circuits. These circuits may be general-purpose circuits, or may be dedicated circuits.

The general or specific aspects of the present disclosure may be implemented by a system, a device, a method, an integrated circuit, a computer program, or a recording medium such as a computer-readable CD-ROM. The general or specific aspects of the present disclosure may be implemented by any combination of a system, a device, a method, an integrated circuit, a computer program, and a recording medium.

For example, the present disclosure may be implemented as an animal data management method executed by a computer such as an animal data management system, may be implemented as a program causing a computer to execute the animal data management method, or may be implemented as a non-transitory computer-readable recording medium having such a program recorded thereon.

Although the animal data management system is implemented by a plurality of devices in Embodiment 2, the animal data management system may be implemented as a single device. When the animal data management system is implemented by a plurality of devices, the components included in the animal data management system described in the embodiment above may be distributed to the plurality of devices in any manner.

Besides, the present disclosure also covers embodiments obtained by performing a variety of modifications conceived by persons skilled in the art on the embodiments above, or embodiments including any combination of the components and the functions included in the embodiments without departing the gist of the present disclosure.

REFERENCE MARKS IN THE DRAWINGS 10 animal individual identification member
11 first base
12 second base
13 identification portion
14 adhesive layer
15 protective layer
20 image capturing unit
32 identification information obtaining unit
33 position information obtaining unit
35 information storage
70 pig (animal)
100 animal data management system

The invention claimed is:

1. An animal individual identification member, comprising:
   a first base that is brought into contact with a body of an animal;
   a second base including an identification portion indicating identification information of the animal by a sequence of mutually different adjacent colors; and
   an adhesive layer which is located between the first base and the second base and bonds the first base and the second base,
   wherein the first base, the second base, and the adhesive layer have identical resin skeletons, and
   the adhesive layer is an adhesive sheet.

2. The animal individual identification member according to claim 1,
   wherein the first base, the second base, and the adhesive layer have urethane skeletons.

3. The animal individual identification member according to claim 1,
   wherein the second base is a non-woven fabric.

4. The animal individual identification member according to claim 1,
   wherein the first base contains an animal-repellent material.

5. The animal individual identification member according to claim 1,
   wherein the identification portion indicates the identification information by a sequence of mutually different adjacent colors aligned in a C-shape.

6. The animal individual identification member according to claim 1,
   wherein the mutually different adjacent colors are fluorescent colors.

7. The animal individual identification member according to claim 1, further comprising:
   a protective layer which covers the identification portion.

8. The animal individual identification member according to claim 7,
   wherein the first base, the second base, the adhesive layer, and the protective layer have identical resin skeletons.

9. An animal data management system, comprising:
- an image capturing unit configured to obtain image data of an image including the animal individual identification member according to claim 1;
- an identification information obtaining unit configured to obtain the identification information based on the image data;
- a position information obtaining unit configured to obtain position information of the animal based on the image data; and
- an information storage configured to store the identification information and the position information in association with each other.

10. The animal individual identification member according to claim 1,
- wherein the identification portion indicates the identification information by a sequence of mutually different three colors.

11. The animal individual identification member according to claim 10,
- wherein the mutually different three colors are red, greed, and blue.

12. The animal individual identification member according to claim 10,
- wherein the sequence of the mutually different three colors are identified as digital data by being captured with a camera.

13. The animal individual identification member according to claim 12,
- wherein adjacent two colors in the sequence of the mutually different three colors indicate 1 or 0 of the digital data.

* * * * *